United States Patent [19]

Roberts

[11] 4,237,098

[45] Dec. 2, 1980

[54] CATALYTIC CONVERTER WITH HOUSING-BED-PLENUM REINFORCING AND SPACING MEANS

[75] Inventor: David E. Roberts, Flint, Mich.

[73] Assignee: General Motors Corporation, Detroit, Mich.

[21] Appl. No.: 33,041

[22] Filed: Apr. 25, 1979

[51] Int. Cl.³ .................... B01J 8/04; F01N 3/28; F01N 3/34; F01N 7/18
[52] U.S. Cl. .................... 422/171; 422/172; 60/301
[58] Field of Search .......... 422/171, 172, 177, 179; 60/299, 301; 423/213.2, 213.7

[56] References Cited

U.S. PATENT DOCUMENTS

| | | | |
|---|---|---|---|
| 3,852,041 | 12/1974 | Moore et al. | 60/299 |
| 3,899,302 | 8/1975 | Wagner | 60/299 |
| 3,927,984 | 12/1975 | Hartley | 60/299 |
| 3,963,448 | 6/1976 | Hartley et al. | 422/172 |
| 4,126,421 | 11/1978 | Morikawa | 422/177 |

FOREIGN PATENT DOCUMENTS 1334810 10/1973 United Kingdom .

Primary Examiner—Bradley R. Garris
Attorney, Agent, or Firm—R. L. Phillips

[57] ABSTRACT

In a catalytic converter, a sheet metal housing encloses a pair of sheet metal catalyst pellet beds and a stud extends through aligned openings in the members of the housing and both inner and outer member of each bed to reinforce these members and also maintain a certain spacing between the members of each bed. The inner bed members are self-piloted and fixed together in alignment at their respective stud openings prior to their assembly in the converter. An enlarged diameter portion is provided on the stud to maintain predetermined spacing between the inner and outer members of one of the beds and a spacer is added which cooperates with the enlarged diameter stud portion to hold the inner bed members in position while also maintaining a predetermined spacing between the members of the other bed. Then on external clamping of the housing members to the outer bed members at the stud, such clamping and spacing is permanently retained by welding the housing members to the ends of the stud.

2 Claims, 11 Drawing Figures

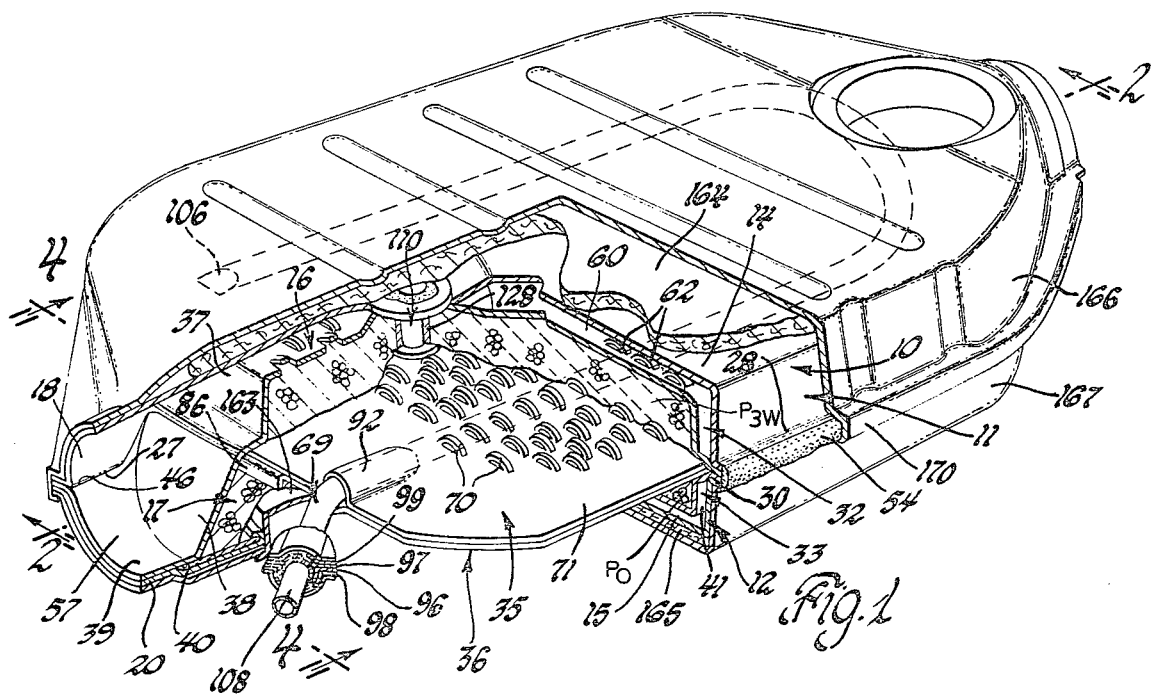

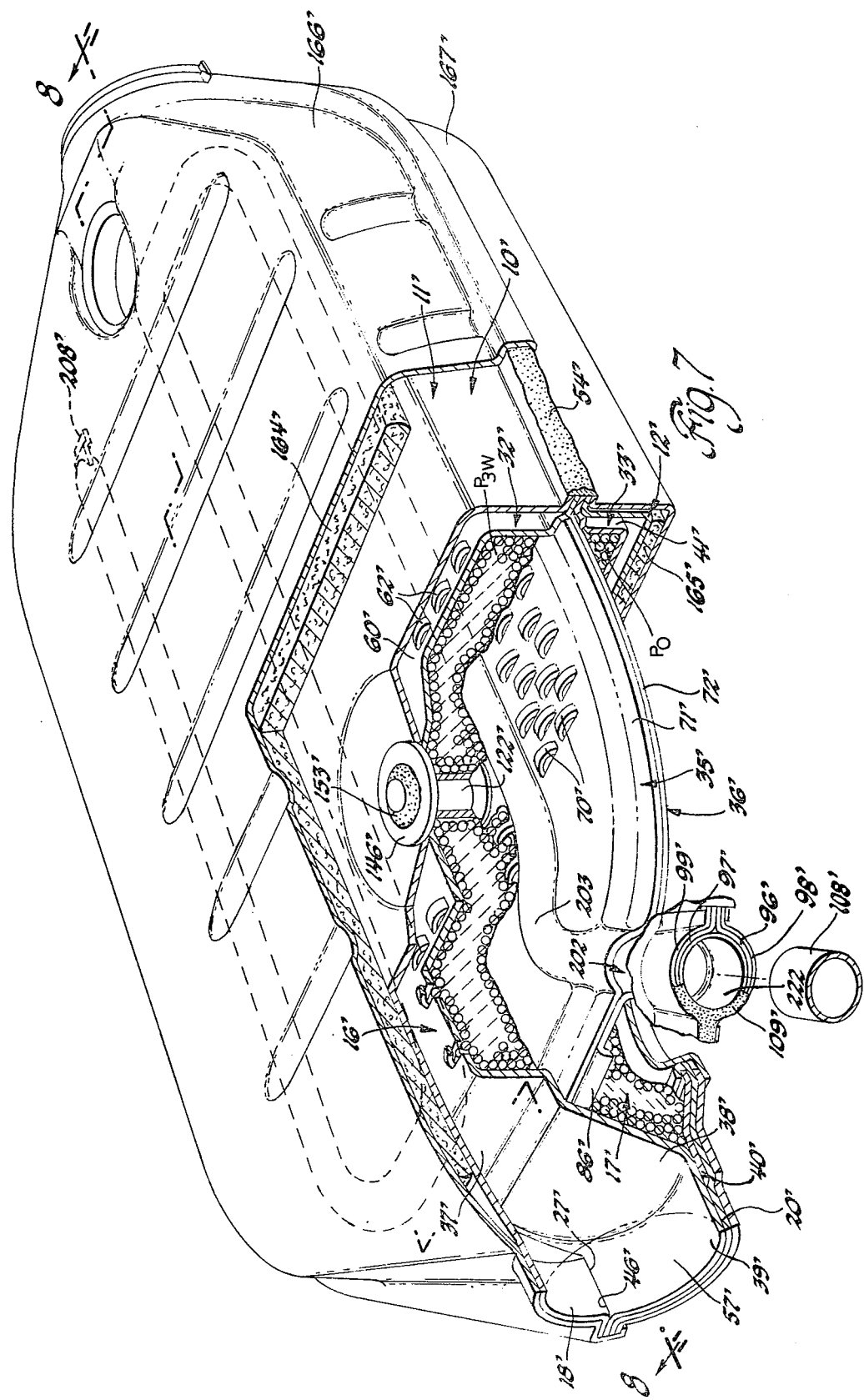

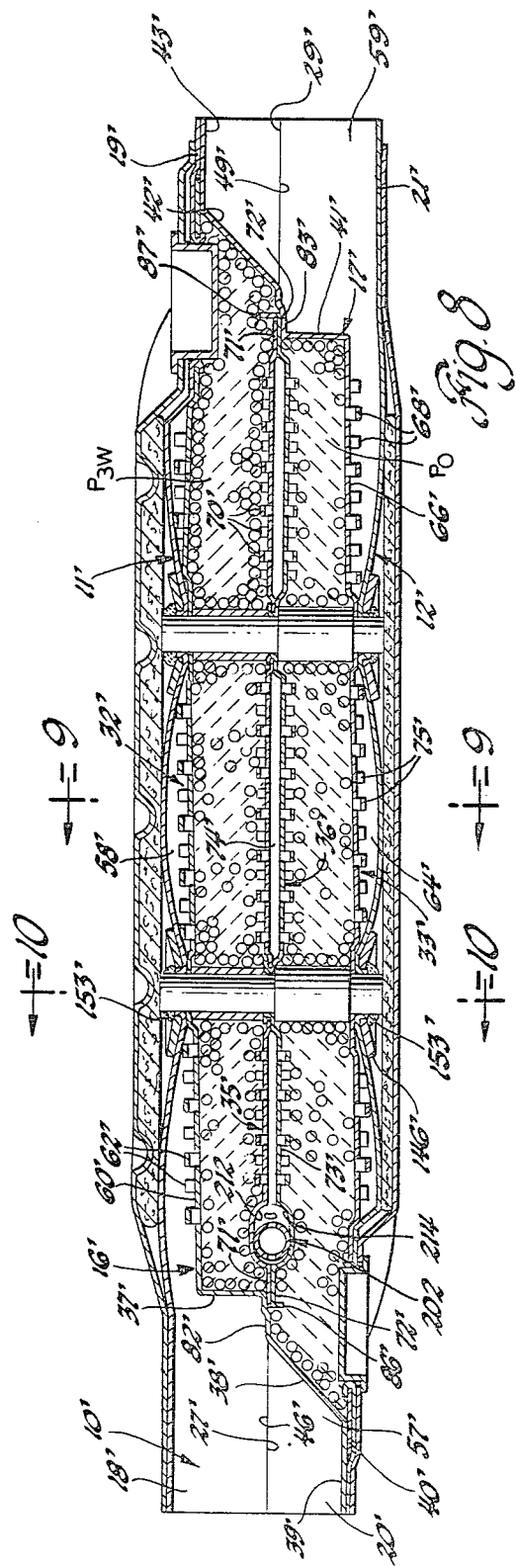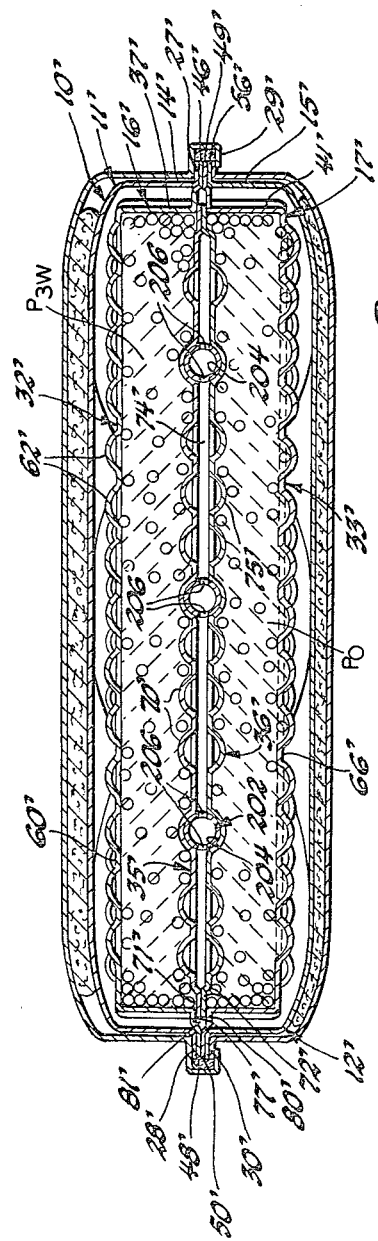

CATALYTIC CONVERTER WITH HOUSING-BED-PLENUM REINFORCING AND SPACING MEANS

This invention relates to catalytic converters for internal combustion engine exhaust gases and more particularly to such converters of the type having a sheet metal housing enclosing a pair of sheet metal catalyst pellet beds.

In catalytic converters of the above type, it is known that a stud may be employed to provide reinforced support and spacing of the catalyst beds within the housing in addition to providing reinforcement of the latter. However, in such arrangements where the beds have inner members which separate the pellets in the beds and also cooperatively form a plenum therebetween for air injection into the exhaust gases passing from one bed to the other, it has been found that the conventional type of stud if it is to provide support for these inner bed members is not then effective to also maintain spacing in both the beds. Furthermore, there is a problem in assuring and maintaining alignment of the stud openings in the inner bed members in a practical way during assembly of both beds in the converter housing.

The present invention solves both such problems with a simple modification of one of the inner bed members and the addition of a spacer sleeve. In the preferred embodiment of the present invention, a neck is formed integral with one of the inner bed members which extends about its stud opening and is formed over the edge of the stud opening in the other inner bed member whereby the inner bed members are self-piloted and fixed together at their stud openings prior to their assembly in the converter. The stud is formed in a conventional way with a large diameter portion which abuts the oppositely facing inner sides of the members of one of the beds to thereby maintain the predetermined spacing therebetween. One end of the stud extends outward through the stud opening in the outer member of this one bed and also through the stud opening in one of the housing members. On the other hand, the other end of the stud extends outward through the stud opening in both the inner bed members which have been previously aligned and secured together at this location. A spacer sleeve is received about the stud and abuts at one end thereof with the inner side of the outer member of the other bed and at the opposite end thereof cooperates with the large diameter stud portion to sandwich both the inner bed members therebetween to thereby maintain the predetermined spacing between the members of this other bed. Then on external clamping of the housing members to the outer bed members at the stud, this clamping and spacing is permanently retained by welding the housing members to the ends of the stud.

These and other objects, features and advantages of the present invention will become more apparent from the following description and drawings in which:

FIG. 1 is a perspective view with parts broken away of a catalytic converter embodying one form of the present invention.

FIG. 2 is a longitudinal sectional view taken along the line 2—2 in FIG. 1.

FIG. 3 is a cross-sectional view taken along the line 3—3 in FIG. 2.

FIG. 7 is a perspective view with parts broken away of a catalytic converter embodying another form of the present invention.

FIG. 8 is a longitudinal sectional view taken along the line 8—8 in FIG. 7.

FIG. 9 is a cross-sectional view taken along the line 9—9 in FIG. 8.

Figure 4:
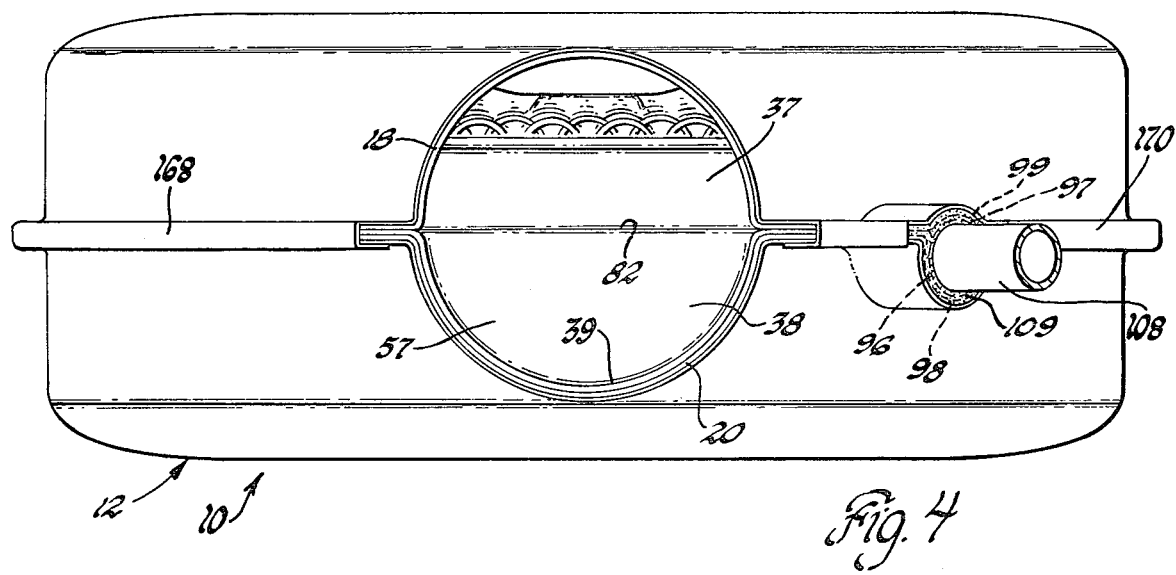
FIG. 4 is an enlarged end view taken along the line 4—4 in FIG. 1.

Each of the two catalytic converters shown is for use in a vehicle to purify the exhaust gases from an internal combustion engine. Both converters are of the dual-bed down-flow type with one bed retaining pellets $P_{3W}$ coated with a 3-way catalyst and the other bed located downstream thereof and retaining pellets $P_O$ coated with an oxidizing catalyst and with the exhaust gases being directed downward through both beds. The converter shown in FIGS. 1–6 has a total bed capacity of about 138 cubic inches for use with small engines of about 3.0 liters and less while the converter shown in FIGS. 7–11 has a total bed capacity of about 250 cubic inches for use with larger engines. It will be understood, of course, that these sizes can vary dependent upon such factors as the catalyst, the particular engine and the emission levels sought.

The converter shown in FIGS. 1–6 has a generally rectangular box profile and comprises a sheet metal housing 10 of the clamshell type consisting of an upper shell member 11 and a lower shell member 12 made of stainless steel. The housing shell members 11 and 12 have a body portion 14 and 15, respectively, which cooperatively enclose a pair of sheet metal catalyst beds or retainers 16 and 17 also made of stainless steel. In addition, the housing shell members 11 and 12 have semi-cylindrical neck portions 18, 19 and 20, 21 respectively, with the two neck portions 18 and 20 cooperating on their concave side to form an inlet opening in one end of the housing and the other two neck portions 19 and 21 cooperating on their concave side to form an outlet opening in the opposite end of the housing. Then for joining together the two housing shell members and mounting the catalyst beds therebetween, the housing shell members 11 and 12 are formed with integral coplanar flanges 27, 28 and 29, 30, respectively, which extend horizontally between the housing ends along opposite sides of the respective body portion 14, 15 and neck portions 18, 19 and 20, 21.

The catalyst beds 16 and 17 consist of an upper and lower perforated shell member 32 and 33 and an upper and lower perforated plate member 35 and 36 with the bed plate members 35 and 36 located between or inward of the bed shell members 32 and 33 and the upper bed shell member 32 has a body portion 37 for retaining the 3-way catalyst pellets $P_{3W}$ and addition has an imperforate portion 38 at one end with a semi-cylindrical neck portion 39. The neck portion 39 nests on its convex side with the concave side of a semi-cylindrical neck portion 40 formed on one end of the lower bed shell member 33. The latter neck portion 40 in turn nests on its convex side with the concave side of the neck portion 20 on the lower housing shell member 12. The lower bed shell member 33 in similar manner has a body portion 41 for retaining the oxidizing catalyst pellets $P_O$ and an imperforate portion 42 with a semi-cylindrical neck portion 43 on the lower bed shell member end opposite its neck portion 40. The neck portion 43 nests on its convex side with the concave side of a semi-cylindrical neck portion 44 formed on the end of the upper bed shell member 32 opposite its neck portion 39. The neck portion 44 in turn nests on its convex side with the concave side of the neck portion 19 on the upper housing shell member 11.

In addition, the upper and lower bed shell members 32 and 33 have co-planar flanges 46, 48 and 49, 50, respectively, which extend horizontally along opposite sides of its respective body portion 37, 41 and neck portions 39, 44 and 40, 43. The respective upper and lower bed shell member flanges 46, 48 and 49, 50 mate along their repective lower and upper side except for the accommodation of an air tube between the flanges 48 and 50 as described later and also mate along their respective upper and lower side with the respective upper and lower housing shell flanges 27, 28 and 29, 30. These flanges are thus mated in a four-layer arrangement along the opposite sides of the housing and have edges sealingly joined together external of the housing by separate welds 54 and 56.

On the other hand, the outer bed members 32 and 33 form a three-layer arrangement with one of the housing shell members at each of the housing openings to thereby provide complete peripheral support of the beds within the housing and also direct the exhaust gases entering the housing first down through the 3-way catalyst bed 16 and then down through the oxidizing catalyst bed 17 and out of the housing. At the inlet end of the converter, the neck portion 39 on the upper bed shell member 32, which is the top of the three-layer bed shell-housing shell member arrangement at this end, cooperates on its concave side with that of the neck portion 18 on the upper housing shell member 11 to provide a cylindrical converter inlet 57 adapted to receive and be edge welded to a pipe (not shown) for connecting the converter into the exhaust system to receive the exhaust gases from the engine. In addition, the outer bed side of the upper bed shell member 32 including its body portion 37 and imperforate portion 38 cooperates with the inner side of the upper housing shell member 11 to form an upper space 58 within the housing directly open to only the housing inlet 57. The imperforate portion 38 is slanted to funnel the exhaust gases upward into the space 58 and the body portion 37 has a perforated top 60 which is flat except in the area of stud openings as described later and except for the formation of a plurality of gas flow holes spaced over the area thereof formed by upwardly projecting louvers 62 which permit gas flow therethrough while retaining the pellets in the upper catalyst bed 16. Thus, the exhaust gases entering the upper space 58 in the converter through the inlet 57 are caused to flow down through the top of the upper catalyst bed 16.

In an inverse manner at the outlet end of the converter, the neck portion 43 on the lower bed shell member 33, which is the bottom of the three-layer bed shell-housing shell member arrangement at this end, cooperates on its concave side with that of the neck portion 21 on the lower housing shell member 12 to provide a cylindrical converter outlet 59 which is adapted to receive and be edge welded to a pipe (not shown) for conveying the purified exhaust gases from the converter into the downstream portion of the exhaust system. The outer bed side of the lower bed shell member 33 including its body portion 41 and imperforate portion 42 cooperates with the inner side of the lower housing shell member 12 to form a lower space 64 within the housing directly open to only the outlet 59. The body portion 41 has a perforated bottom 66 which is flat except in the area of stud openings as described later and except for the formation of a plurality of gas flow holes spaced over the area thereof formed by downwardly projecting louvers 68 which permit gas flow therethrough while retaining the pellets in the lower catalyst bed 17. Thus, the exhaust gases are caused to flow down through the bottom of the lower catalyst bed 17 to the lower space 64 and the imperforated portion 42 is slanted to direct the gases upward therefrom to the outlet 59.

Furthermore, it will be seen in FIG. 3 that the outer bed member body portions 37, 41 have vertical imperforate sides which are spaced inward from vertical sides of the respective housing member body portions 14, 15 and that the corresponding vertical sides of the respective bed member body portions and housing member body portions are vertically aligned. In addition, it will be seen in FIGS. 2 and 4 that the opposite sides of the outer bed member body portions 37 and 41 are evenly tapered in height in opposite directions so that the perforated top 60 of the upper catalyst bed 16 is slanted to gradually decrease the overhead flow area in the upper space 58 in the direction of the entering gas flow into the upper bed while the perforated bottom 66 of the lower catalyst bed 17 is slanted in the same direction and parallel to the top 60 of the upper bed to gradually increase the underneath flow area in the lower space 64 in the direction of the exiting gas flow from the lower bed. With such arrangement, the total depth of the pellets in the two beds 16 and 17 is made uniform thereacross and that coupled with the oppositely tapered flow areas above and below effects even distribution of the gas flow across the flow area of both beds.

The pellets $P_{3W}$ and $P_O$ in the two beds are separated and a plenum is provided therebetween for air injection by the two perforated inner bed members 35 and 36 cooperating with each other and with the outer bed members 11 and 12. Furthermore, the inner bed members 35 and 36 are peripherally mounted so that they are supported by the outer bed members 11 and 12 and the housing shell members 11 and 12 while relative expansion with heat is permitted therebetween to maintain their sealed integrities. The upper bed plate member 35 is flat except for a reinforcement rib and accommodating a round air tube 69 as described later and except for the formation of gas flow holes spaced over the area thereof formed by upwardly projecting louvers 70 which are located inward of a peripheral margin or flange 71 and permit gas flow therethrough while retaining the pellets in the upper catalyst bed 16. The flange 71 on the upper bed plate member mates along its lower side with the upper side of a peripheral flange 72 formed on the lower bed plate member 36 and these flanges are spot-welded together at spaced points along their length after piloted assembly and flanged connection of the inner bed members as described in detail later. The lower bed plate member 36 inward of its peripheral flange 72 has a perforated portion 73 which is displaced or recessed downward and thus away from the lower side of the perforated portion of the upper bed plate member 35 to provide a space or plenum 74 therebetween and thus between the two catalyst beds 16 and 17 for air injection into the downwardly passing exhaust gases. The perforated portion 73 is flat except for a stiffening rib and central projections and accommodating the air tube 69 as described later and except for the formation of a plurality of gas flow holes spaced over the area thereof formed by downwardly projecting louvers 75 which permit gas flow therethrough while retaining the pellets in the lower catalyst bed 17. Furthermore, it will be seen at this point that the louvers in all the bed members extend transversely thereof with the louvers in the upper bed shell member thus extending transverse to the entering exhaust gases while the louvers in the lower bed shell member extend transverse to the exiting exhaust gases.

The inner bed members 35 and 36 are supported, but not fixed, completely along the longitudinal portions of their mating flanges 71 and 72 between the respective outer bed member flanges 46, 49 and 48, 50 and inward of the respective housing shell member flanges 27, 29 and 28, 30. For this purpose, there is formed a longitudinally extending recess 76, 77 and 79, 80 in the lower and upper side of the respective inner bed member flanges 46, 49 and 48, 50. The associated recesses 76, 79 and 77, 80 form a pocket between the respective flanges 46, 49 and 48, 50 which is located inward of where these flanges are welded to the housing shell member flanges and which is open to receive the mating inner bed member flanges. The vertical width of the pockets is sized so as to tightly but slidably receive the mating inner bed member flanges while a sufficient horizontal end clearance 81 is provided therebetween so as to permit relative sliding movement in the horizontal direction between the periphery of the inner bed members and the outer bed members and thus also between the periphery of the inner bed members and the housing shell members occasioned by relative heat expansion of these parts. To then complete the separation of the catalyst pellets in the beds, there is formed a shoulder 82, 83 on and across the imperforate portion 38, 42 of the respective outer bed members 32, 33 located immediately adjacent the shallow end of the respective body portion 37, 41 of these members. The shoulders 82, 83 extend horizontally across the respective imperforate portions 38, 42 and join at opposite ends with the respective flanges 46, 48 and 49, 50 of the outer bed members. The shoulders 82, 83 are co-planar with the bottom of the recesses 76, 77 and 79, 80, respectively, in the flanges 46, 48 and 49, 50 with which they join and are located so that the shoulder 82 engages the upper side of the flange 71 on the upper bed plate member 35 completely along its end closest the inlet 57 while the other shoulder 83 engages the lower side of the flange 72 on the lower bed plate member 36 completely along its end closest the outlet 59. In addition, at the one end of the respective inner bed members 35 and 36 which is opposite but does not bear against the respective shoulders 82 and 83, there is formed a downwardly bent rib 86 and an upwardly bent rib 87, respectively, to reinforce the flange engagement of the inner bed plate members with the respective shoulders. Thus the separation of the pellets $P_3w$ and $P_O$ in the beds 16 and 17 is completed by cooperation of the respective outer bed member shoulders 82 and 83 with the mating inner bed member flanges 71 and 72 at the opposite ends of the inner bed members while the ends of the inner bed members and the respective imperforate portions 38 and 42 of the outer bed members are left free to expand with heat relative to each other in the horizontal direction. Furthermore, it will be seen that with such shoulder engagement the upper bed shell member 32 at its imperforate portion 38 cooperates with the body portion 41 of the lower bed shell member 33 in the formation of the lower catalyst bed 17 and also provides a place at this end of the lower catalyst bed out of the flow path therethrough through which the bed can be filled with pellets through the bottom of the converter as described in detail later. In similar manner, the lower bed shell member 33 at its imperforate portion 42 cooperates with the body portion 37 of the upper bed shell member 32 in the formation of the upper catalyst bed 16 and also provides a place at this end of the upper catalyst bed out of the flow path therethrough through which the bed can be filled with pellets through the top of the converter as described in detail later.

Provision for the air tube 69 in the plenum 74 is provided by a single-loop, partial-cylindrical imperforate channel 88 formed in the upper side of the recessed and otherwise perforated portion 73 of the lower bed plate member 36. The imperforate channel 88 extends longitudinally of the recessed portion 73 from the end thereof closest the converter inlet 57 to the opposite end thereof closest the converter outlet 59 and then makes a reverse turn across the latter end and returns longitudinally of the recessed portion and joins with a partial cylindrical channel 89 in and across the upper side of flange 72 at a point located to one side of the converter inlet. The channel 88 cooperates with the lower side of the perforated area of the upper bed plate member 35 to provide a U-shaped tube receiving cavity between the inner bed members 35 and 36 that is open on opposite sides to the plenum 74 and is open at one end to a cylindrical opening between the inner bed member flanges 71 and 72 provided by the channel 89 in flange 72 cooperating with a partial-cylindrical channel 92 in and across the lower side of flange 71. Then for entry of the air tube through the converter to the tube receiving cavity between the inner bed members, there is provided a partial-cylindrical channel 96 in and across the upper side of the lower bed shell member flange 50 and a partial-cylindrical channel 97 in and across the lower side of the upper bed shell member flange 48. The channels 96 and 97 cooperatively provide a cylindrical opening therebetween directed at an angle toward the opening between the inner bed members provided by channels 89 and 92. And it will be seen that the lower channel 96 is made deeper than the upper channel 97 to accommodate for the downward displacement of the centerline of the tube receiving cavity between the inner bed members 35 and 36 relative to their mating flanges 71 and 72 so that the tube openings between the flanges of the inner bed members and the outer bed members 32 and 33 are vertically aligned. To then accommodate the respective channels 96, 97 between the housing shell members, these channels nest on their respective convex side with a partial-cylindrical channel 98, 99 extending in and across the respective upper side of the lower housing shell member flange 30 and the lower side of the upper housing shell member flange 28.

The round air tube 69 is made of stainless steel and is bent in a U-shape for mounting between the inner bed plate members 35 and 36 in the tube receiving cavity provided in part by the imperforate channel 88. The air tube 69 extends above the height of the channel 88 and engages along its length at diametrically opposite sides with the bottom of the channel and the flat lower side of the perforated area of the upper bed plate member 35 with such arrangement leaving oppositely facing side areas of the air tube above the channel exposed to the plenum 74. A plurality of holes 104 are formed in the thus exposed side areas of the air tube at points spaced along the length thereof and are thus open to the plenum. The end 106 of the air tube within the plenum is closed by flattening thereof while the other end 107 is open and is provided with an enlarged diameter adapted to receive a pipe (not shown) for delivering air thereto. The air tube where it extends outward of the plenum has an imperforate portion 108 which is tightly but slidably received between the channel 92, 89 of the respective inner bed members 35, 36 and then is bent to align with and be received between the channels 97 and 96 of the respective outer bed members 32 and 33 with its open end 107 terminating at the edges of the outer bed shell member flanges 48, 50 and housing shell member flanges 28 and 30. With the air tube thus installed a weld 109 is then made external of the housing between the pipe 108 and the edge of the open end of the air tube 69 and those of the nesting channels 96, 98 and 97, 99 of the outer bed members and the housing shell members. Thus, the air tube is sealingly fixed to the converter housing and the outer bed members but is free to expand with heat internally thereof both with and relative to the inner bed members while also maintaining the spacing therebetween in the plenum. Furthermore, it will be seen that with such mounting of the air tube 69 between the inner bed members 35 and 36 and the location of the holes 104 therein, the air is injected transversely into the exhaust gases over the entire volume of the plenum and immediately after leaving the upper catalyst bed 16 for uniform and early mixing with the exhaust gases passing to the lower catalyst bed 17 while the perforated area of the upper bed plate member 35 is permitted to extend over the top side of the air tube to minimize restriction to flow through the upper catalyst bed.

Reinforced support and spacing of the catalyst beds 16 and 17 within the housing 10 coupled with reinforcement of the latter is provided by a pair of identical studs 110 which extend vertically through aligned openings in the sheet metal members of the housing and both of the catalyst beds. The studs are located centrally crosswise of the converter between the legs of the air tube 69. At each of the stud locations (see FIGS. 5 and 6), the lower bed plate member 36 is formed with an upwardly projecting cylindrical neck 115 having a reduced diameter portion 116 about its stud opening 117 which is closely received by the stud opening 118 in the upper bed plate member 35. After mounting the air tube 69 between the inner bed members 35 and 36, the reduced diameter neck portion 116 is positioned to extend upward and through the stud opening 118 in the upper bed plate member 35 whereafter it is crimped over the edge thereof while the neck 115 engages the lower flat side of the upper bed plate member to maintain the height of the plenum 74 at this location. The inner bed members 35 and 36 with the air tube 69 mounted therebetween are thus piloted into alignment and fixed together at their stud openings whereafter their flanges 71 and 72 are spot-welded prior to mounting of the inner bed members with the air tube as a completed subassembly between the outer bed members 32 and 33.

The studs 110 have a short and long cylindrical portion 120, 122 of equal diameter extending inward from the respective lower and upper end thereof separated by an intermediate cylindrical portion 124 of larger diameter which serves as a spacer for the lower bed. Each of the studs 110 is first located between the lower bed plate member 36 and the lower bed shell member 33 whereafter its lower end with the short small diameter portion 120 may then be inserted downward or outward through the respective openings 126, 127 therefor in the lower bed shell member 33 and lower housing shell member 12 while the stud's upper end with the long small diameter portion 122 may then be inserted upward or outward through the respective openings 117 and 118 in the previously secured together inner bed members 36 and 35. Next, a hollow cylinder or sleeve 128 which serves as a spacer for the upper bed is mounted on the long small diameter stud portion 122 between the upper bed plate member 35 and the upper bed shell member 32. Then the upper stud end with the long small diameter stud portion 122 may be inserted upwardly or outwardly through the respective opening 130 and 132 therefor in the upper bed shell member 32 and upper housing shell member 11.

Figure 5:
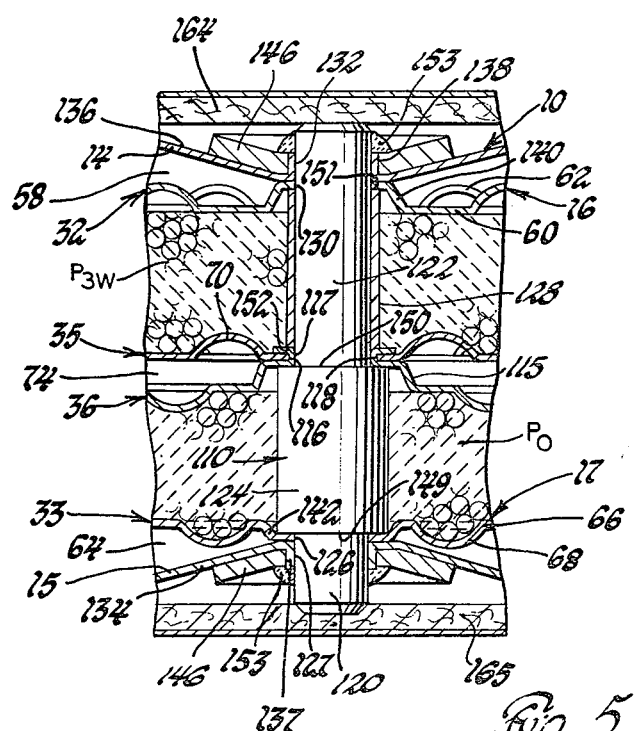
FIG. 5 is an enlarged partial view taken along the line 5—5 in FIG. 3.
Figure 6:
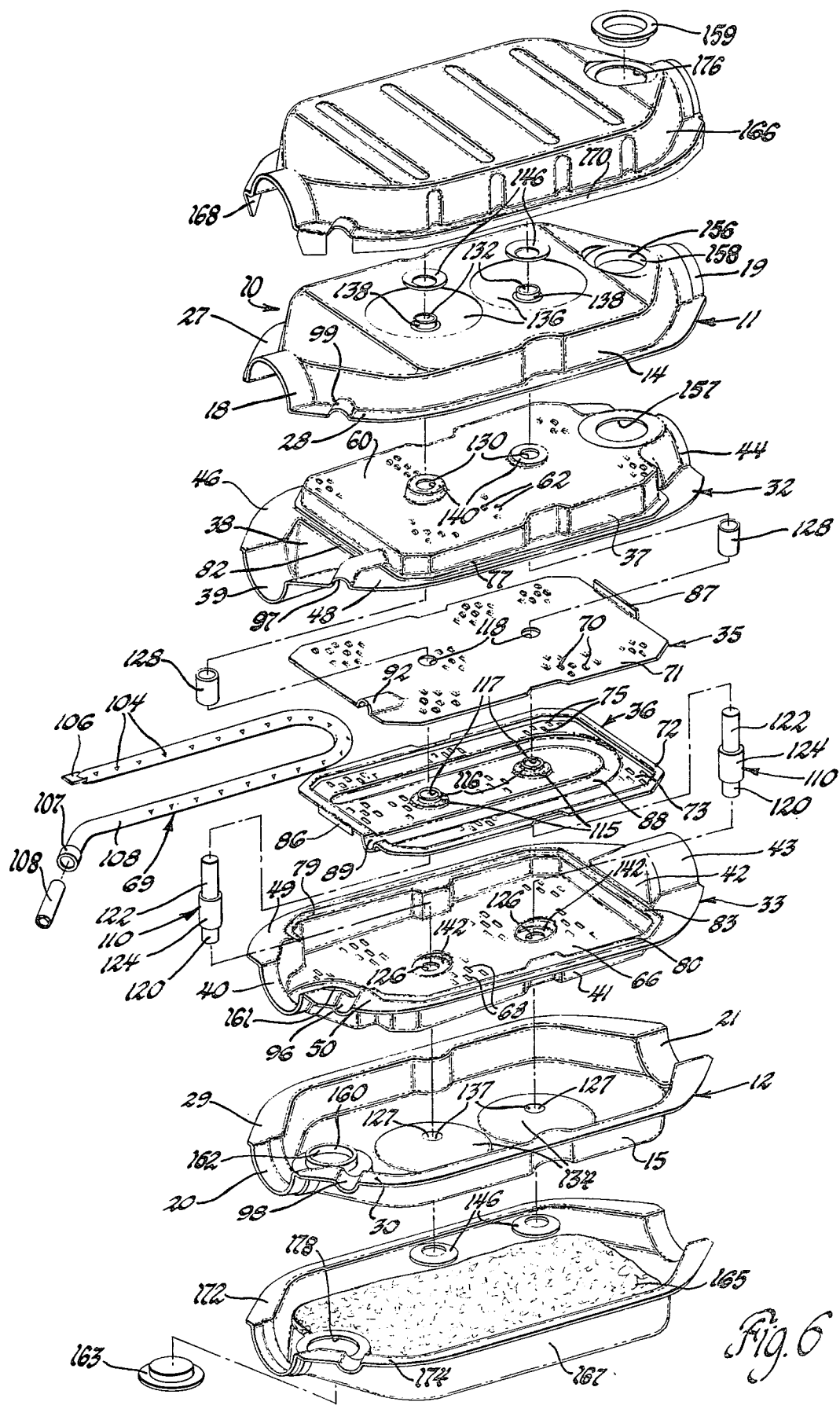
FIG. 6 is an exploded view of the converter in FIG. 1.
Figure 10:
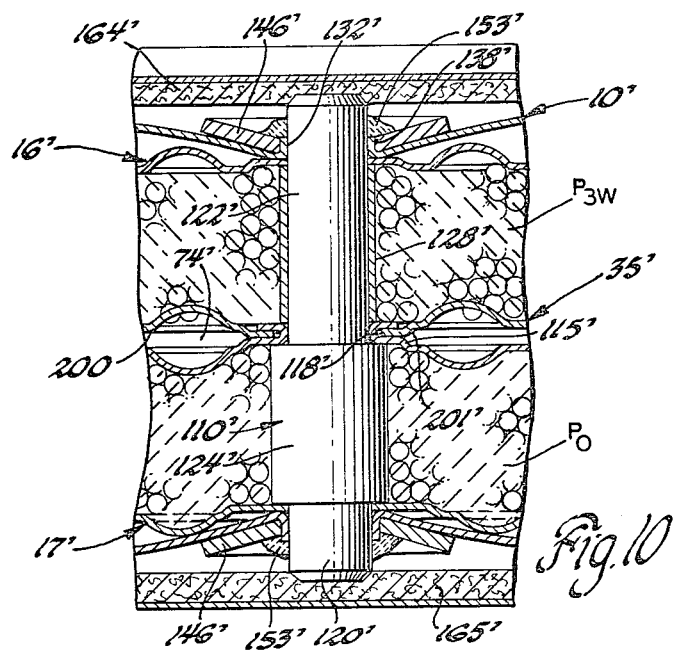
FIG. 10 is an enlarged partial view taken along the line 10—10 in FIG. 8.
Figure 11:
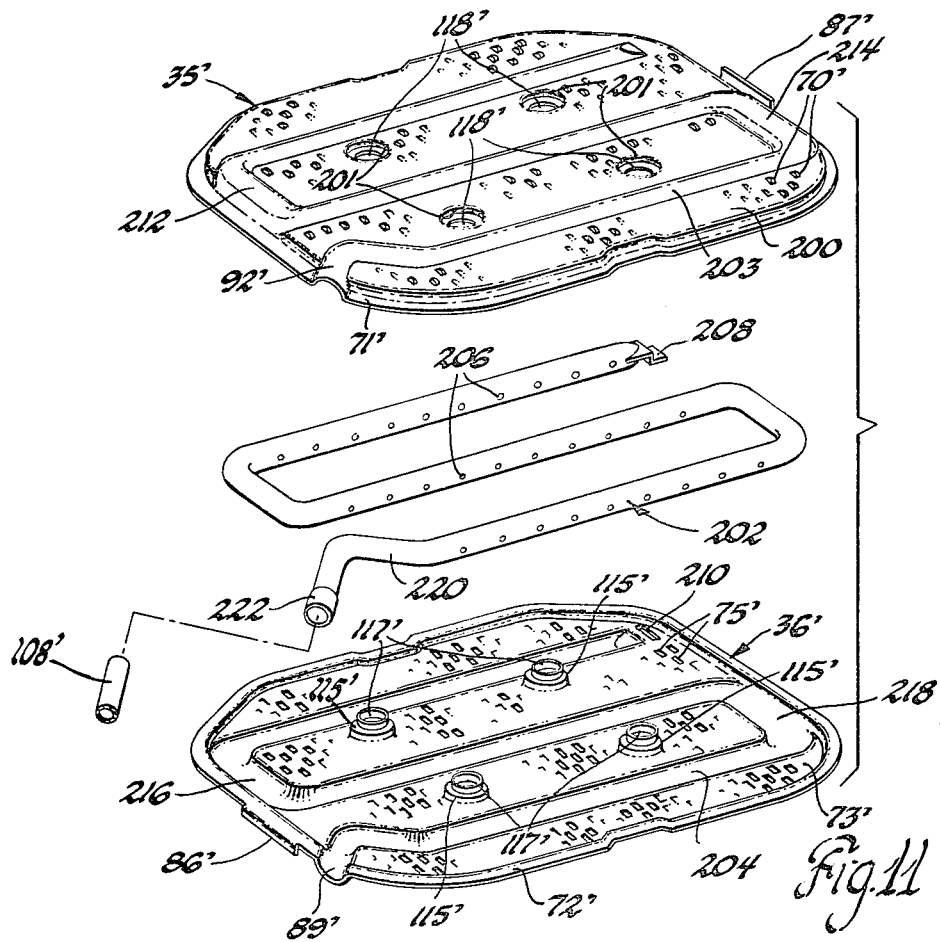
FIG. 11 is an exploded view of the inner bed members and air tube of the converter in FIG. 7.

Each of the stud openings 127, 132 in the respective lower and upper housing shell members 12, 11 is located in the center of a separate substantially conical recessed area 134, 136 formed in the bottom and top of the respective housing shell members. The respective housing shell member recessed areas 134, 136 have an outwardly projecting neck 137, 138 about their stud opening 127, 132 for receiving the respective short and long small diameter stud portion 120, 122 and bear on their inner side directly against the lower side and upper side of the respective outer bed members 33, 32. In addition, the respective outer bed members 32 and 33 are formed with an upwardly and downwardly projecting neck 140 and 142 about their respective stud openings 130 and 126. The necks 140 and 142 engage the respective lower and upper side of the housing shell members 11 and 12 and for that purpose their heights are different to accommodate for the slant of the converter beds. Thus, at the left-hand stud as seen in FIGS. 5 and 6, the lower neck 142 is shorter than the upper neck 140 with this relative dimensioning reversed at the right-hand stud. A washer 146 is then located about each of the housing shell member necks 137 and 138 and against the lower and upper side of the respective housing shell members 12, 11.

The axial lengths of the large diameter stud portion 124 and the sleeve 128 are determined so that when the converter assembly is clamped together at the washers 146 the axially spaced annular shoulders 149 and 150 of the large diameter stud portion 124 abuts with the oppositely facing inner sides of the lower bed members 33 and 36 to maintain the desired spacing therebetween while the upper annular end 151 of sleeve 128 abuts with the inner side of the upper bed shell member 32 and the lower annular end 152 of the sleeve cooperates with the upper stud shoulder 150 to sandwich the two inner bed members 35 and 36 therebetween at their flanged connection to maintain the desired spacing between the upper bed members 32 and 35. With the assembly thus clamped, a continuous weld 153 is provided between the respective projecting ends of the stud, the housing necks 137, 138 and the inner diameter of the washers 146 to thus seal the converter at these stud locations while fixing the stud 110 and sleeve 128 in place to maintain the clamped condition and thus the bed spacing in addition to strengthening the housing.

Filling of the upper catalyst bed 16 is provided through the top of the converter by an opening 156, 157 in the respective upper housing shell member 11 and upper bed shell member 32 adjacent the converter outlet with the upper housing member having a downwardly projecting neck 158 about its opening which extends through and is crimped over the edge of the opening 157 in the upper bed shell member 32. After the upper bed has been filled with the catalyst coated pellets P3w, the opening thereto is closed by a sheet metal plug 159 of stainless steel. On the other hand, the lower catalyst bed 17 is filled through the bottom of the converter by an opening 160, 161 in the respective lower housing shell member 12 and lower bed shell member 33. The opening 160 in the lower housing shell member 12 is provided with an upwardly projecting neck 162 thereabout which extends through and is crimped over the edge of the opening 161 in the lower bed shell member 33. After the lower bed has been filled with the catalyst coated pellets P$_O$, the opening thereto is closed by a sheet metal plug 163 of stainless steel.

The converter housing is insulated by two sheets 164 and 165 of heat insulating material which respectively lay across the top and bottom thereof and are held in place by a pair of sheet metal cover members 166 and 167 of aluminum coated steel and of which only the upper cover member is ribbed in the transverse direction for strength. The cover members 166 and 167 generally conform to the outer profile of the converter housing while leaving the inlet, outlet and air tube open. The cover shell members are spaced outwardly from the sides of the housing and are joined together by crimping flanges 168, 170 on the top cover member over flanges 172, 174 on the lower cover member at the welded flanges of the housing shell members and outer bed members. In addition, the cover members 166 and 167 have a fill opening 176 and 178 therethrough, respectively, and fit under the flange of the respective plugs 159 and 163 whereby the cover members are secured to the converter at these points when the plugs are inserted while leaving access through the cover for filling the catalyst beds.

Turning now to the larger size catalytic converter shown in FIGS. 7-11, the parts thereof similar to those of the converter in FIGS. 1-6 and previously described are identified by the same numbers but primed while different structural features as will now be described are identified by new reference numbers.

In the catalytic converter shown in FIGS. 7-11 the housing 10' and catalyst beds 16' and 17' are scaled up in size so as to provide a substantially larger bed area and thus increased bed volume without substantial change in converter height. This is accompanied by a corresponding increase in flow area across the plenum 74' wherein the louvers 70' in the upper bed plate member 35' are now located in an upwardly recessed area 200 inward of the flange 71' while maintaining the same height in the plenum. This is accomplished by making the depth of the recessed perforated portion 73' one-half that in the converter in FIGS. 1-5 and making the depths of the recessed perforated portion 200 in the upper bed plate member 35 the same as that of the recessed perforated portion 73'. And to then connect the inner bed members 35' and 36' as before at their respective stud openings 118' and 117', the height of the necks 115' on the lower bed plate member 36' are correspondingly reduced while a downwardly projecting neck 201 of equal height if now provided about each of the stud openings 118' in the upper bed plate member 35'.

Air distribution within the large plenum 74' is provided by a round S-shaped air tube 202. To accommodate the S-shaped tube 202 in the plenum 74', both the inner bed members 35' and 36' are provided on their inner or plenum side with a double-loop, partial-cylindrical imperforate channel 203 and 204, respectively. The imperforate channels 203 and 204 are formed in the respective lower and upper side of the recessed and otherwise perforated portion 200 and 73' of the respective inner bed members 35' and 36'. The imperforate channels 203 and 204 extend longitudinally of the respective recessed perforated portions 200 and 73' from the end thereof closest the converter inlet 57' to the opposite end thereof closest the converter outlet 59' and then make a reverse turn and return centrally thereof. The channels 203 and 204 then make a second reverse turn and return longitudinally of the respective recessed perforated portions 200 and 73' to join with the respective semi-cylindrical channels 92' and 89' which form the cylindrical opening between the inner bed plate member flanges 71' and 72'. The imperforate channels 203 and 204 cooperate to provide an S-shaped tube receiving cavity between the inner bed members 35' and 36' that is open on opposite sides to the plenum 74'. The air tube 202 engages along its length at diametrically opposite sides with the bottom of the respective channels 203 and 204 while leaving oppositely facing side areas thereof exposed to the plenum 74'. A plurality of diametrically opposite facing holes 206 are formed in the thus exposed areas of the air tube at points spaced along the length thereof and are thus open to the plenum. The end 208 of the air tube within the plenum is closed by flattening thereof and is bent so that it hooks to the lower bed plate member 36' through a hole 210 provided in the recessed perforated portion 73' thereof whereby the closed end of the tube is thus restrained. On the other hand, the two bends 212, 214 and 216, 218 of the respective imperforate channels 203 and 204 have an enlarged cross-section to accommodate relative expansion with heat between the air tube 202 and the two inner bed plate members 35' and 36'. The air tube 202 where it extends outward of the plenum has an imperforate portion 220 which is tightly but slidably received between the channels 89' and 92'. The imperforate tube portion 220 is bent for alignment with and mounting between the nesting outer bed members and housing shell member channels 97', 99' and 96', 98' with the open and enlarged end 222 of the S-shaped tube 202 then fixed and sealed thereto and to the air delivery pipe 108' by weld 109 109' like the U-shaped tube 69 previously described. However, it will be seen that the center-line of the tube receiving cavity between the inner bed members 35' and 36' now aligns with their mating flanges 71' and 72' and as a result the tube accommodating channels across the flanges of the outer bed members 32' and 33' and the housing shell members 11' and 12' are now semi-cylindrical to provide for vertical alignment of the tube openings which they form.

Reinforced support and spacing of the catalyst beds 16' and 17' within the housing 10' coupled with reinforcement of the latter is provided by four studs 110' and associated structure like that earlier described. The studs 110' are located for best effect at points spaced longitudinally of and between adjacent legs of the S-shaped air tube 202.

The above described embodiments are illustrative of the invention which may be modified within the scope of the appended claims.

The embodiments of the invention in which an exclusive property or privilege is claimed are defined as follows:

1. In a catalytic converter for internal combustion engine exhaust gases and of the type having a sheet metal housing enclosing a pair of sheet metal catalyst pellet beds with a stud extending through aligned openings in the members of the housing and both the inner and outer members of each bed to reinforce all these members and also maintain a certain spacing between the members of each bed and wherein the inner bed members also cooperate to form a plenum between the beds: the improvement comprising in combination, a neck integral with one of the inner bed members and extending about its opening and formed over the edge of the opening in the other inner bed member whereby the inner bed members are fixed together in alignment prior to their assembly in the converter, first spacer means integral with the stud for abutting oppositely facing inner sides of the members of one of the beds to thereby maintain a predetermined spacing therebetween, one end of the stud extending outward through the opening in the outer member of said one bed and also through the opening in one of the housing members, the other end of the stud extending outward through the opening in both of the inner bed members and also through both the opening in the outer member of the other bed and the opening in the other housing member, and second spacer means received about the stud and abutting at one end thereof with the inner side of the outer member of said other bed and at the opposite end thereof cooperating with said first spacer means to sandwich both the inner bed members therebetween to thereby maintain a predetermined spacing between the members of said other bed and whereby on external clamping of the housing members to the outer bed members at the stud, such clamping and spacing is permanently retained by fixing the housing members to the ends of the stud.

2. In a catalytic converter for internal combustion engine exhaust gases and of the type having a sheet metal housing enclosing a pair of sheet metal catalyst pellet beds with a stud extending through aligned openings in the members of the housing and both the inner and outer members of each bed to reinforce all these members and also maintain a certain spacing between the members of each bed and wherein the inner bed members also cooperate to form a plenum between the beds: the improvement comprising in combination, a neck integral with one of the inner bed members and extending about its opening and formed over the edge of the opening in the other inner bed member whereby the inner bed members are fixed together in alignment prior to their assembly in the converter, axially spaced annular shoulders on the stud abutting oppositely facing inner sides of the members of one of the beds to thereby maintain a predetermined spacing therebetween, one end of the stud extending outward through the opening in the outer member of said one bed and also through the opening in one of the housing members, the other end of the stud extending outward through the opening in both of the inner bed members and also through both the opening in the outer member of the other bed and the opening in the other housing member, and a spacer sleeve received about the stud and abutting at one annular end thereof with the inner side of the outer member of said other bed and abutting at the opposite annular end thereof with said neck of said one inner bed member to thereby maintain a predetermined spacing between the members of said other bed and whereby on external clamping of the housing members to the outer bed members at the stud, such clamping and spacing is permanently retained by fixing the housing members to the ends of the stud.

* * * * *